United States Patent
Hu et al.

(10) Patent No.: US 12,458,176 B1
(45) Date of Patent: Nov. 4, 2025

(54) COOKING UTENSIL WITH STIRRING FUNCTION

(71) Applicant: ZHEJIANG NOVIA KITCHENWARE CO., LTD., Jinhua (CN)

(72) Inventors: Huacheng Hu, Jinhua (CN); Chengzhou Zhang, Jinhua (CN); Jinzhi Ye, Jinhua (CN)

(73) Assignee: ZHEJIANG NOVIA KITCHENWARE CO., LTD., Jinhua (CN)

( * ) Notice: Subject to any disclaimer, the term of this patent is extended or adjusted under 35 U.S.C. 154(b) by 0 days.

(21) Appl. No.: 19/064,423

(22) Filed: Feb. 26, 2025

Related U.S. Application Data

(63) Continuation of application No. PCT/CN2024/120635, filed on Sep. 24, 2024.

(51) Int. Cl.
*A47J 43/08* (2006.01)
*A47J 36/06* (2006.01)
*A47J 43/044* (2006.01)

(52) U.S. Cl.
CPC ............ *A47J 43/082* (2013.01); *A47J 36/06* (2013.01); *A47J 43/044* (2013.01)

(58) Field of Classification Search
CPC ........ A47J 43/082; A47J 36/06; A47J 43/044; A47J 19/025; A47J 19/023; A47J 43/0722; A47J 43/046; A47J 43/085; A47J 43/0465; A47J 43/0716; A47J 43/07; A47J 27/09; A47J 27/04; A47J 2027/043

USPC .......... 99/331, 348, 353, 452, 485, 501, 538
See application file for complete search history.

(56) References Cited

U.S. PATENT DOCUMENTS

2023/0309588 A1    10/2023    Lake et al.

FOREIGN PATENT DOCUMENTS

| CN | 201379457 Y | | 1/2010 | |
|---|---|---|---|---|
| CN | 201379462 Y | * | 1/2010 | ............ A47J 43/04 |
| CN | 115919132 A | | 4/2023 | |
| CN | 220936635 U | | 5/2024 | |
| JP | 2017154060 A | | 9/2017 | |
| WO | 2022050509 A1 | | 3/2022 | |

OTHER PUBLICATIONS

PCT International Search Report and written opinion, for PCT/CN2024/120635, total 7 pages, mailed on Dec. 23, 2024.

* cited by examiner

*Primary Examiner* — Phuong T Nguyen

(74) *Attorney, Agent, or Firm* — Mei & Mark LLP; Manni Li

(57) ABSTRACT

A cooking utensil with stirring function comprises a pot body and a lid body, and the cooking utensil with stirring function is further provided with a stirrer and a stirrer driving mechanism; the stirrer driving mechanism comprises an operating member, a rack, and a driving shaft; and a mounting cavity is formed on an upper surface of the lid body, the rack is arranged inside the mounting cavity, and the operating member is connected to the rack and controls the rack to perform reciprocating movements inside the mounting cavity.

3 Claims, 4 Drawing Sheets

COOKING UTENSIL WITH STIRRING FUNCTION

CROSS-REFERENCE TO RELATED APPLICATIONS

The subject application is a continuation of PCT international stage application PCT/CN2024/120635 filed on Sep. 24, 2024. The subject application claims priority to the PCT international stage application PCT/CN2024/120635, which is incorporated by reference herein in its entirety.

TECHNICAL FIELD

The present invention relates to cooking utensils, such as pots, and particularly relates to a cooking utensil with stirring function.

BACKGROUND ART

As a cooking utensil, a popcorn maker is a specialized cooking tool for making popcorns. Specifically, popcorn makers comprise traditional hand-cranked popcorn maker, electric popcorn maker, single-pot popcorn maker, and double-pot popcorn maker. With the improvement of living standards, there is an increasing demand for small and easy-to-operate food processing equipment suitable for household use.

The biggest problem of the popcorn makers is that rice or corn kernels, and the like, in contact with a pot bottom are exposed to the most heat, and are most likely to pop, while kernels at an upper layer receive less heat and are less likely to pop. Therefore, once the kernels at the upper layer pop, the kernels at the pot bottom are often scorched. In addition, seasonings such as oil, sugar, and salt need to be added during a cooking process, and usually become harden during heating, thereby causing the processed kernels to stick to an inner surface of the pot.

In order to solve the above problems, Chinese patent no. CN220936635U discloses a popcorn maker, which comprises a frying pot. A closed lid is arranged above the frying pot, a planetary gear drive disk is fixed onto a top of the closed lid, a motor is arranged on a top of the planetary gear drive disk, an input end of the motor is connected to the planetary gear drive disk, a connecting rod is arranged below the closed lid, an upper end of the connecting rod is connected to the planetary gear drive disk, a lower end of the connecting rod extends into an interior of the frying pot, and a frying plate is detachably fixed at a bottom of the connecting rod. The technical solution is limited to the frying pot and lacks versatility, and does not effectively flip the processed material at a bottom of the pot. Moreover, the motor is used as a driving mechanism, making it difficult to control, and wires of the motor could affect the use of the popcorn maker on a gas stove.

U.S. Patent Application Publication No. US20230309588A1 discloses a corn popper with an agitator, comprising a pot, which comprises one or more interior surfaces defining an interior volume of the pot; a lid assembly comprising a lid configured to mate with the pot; a crank coupled to and configured to rotate in relation to the lid; and a linkage coupled to and configured to rotate with the crank; and an agitator assembly configured to be positioned within the interior volume of the pot, and to releasably engage the linkage when the lid is mated with the pot. The solution is more suitable for household use. However, in order to fix the agitator, a protrusion is formed at a bottom of the pot, the agitator is provided with a through hole at a blade to cooperate with the agitator, such that the agitator can be mounted on the protrusion. The technical solution has special requirements for the pot and incurs high cost. Moreover, the agitator has a complex annular structure, making the installation troublesome, and the annular structure of the agitator will rub against an inner surface of the pot during stirring, making the operation laborious.

SUMMARY OF THE INVENTION

The present invention provides a cooking utensil with stirring function, which solves the problems of uneven heating, insufficient popping, and easy scorching of processed material at bottoms in existing popcorn machines.

The present invention provides a cooking utensil with stirring function, which comprises a pot body and a lid body, and is further provided with a stirrer and a stirrer driving mechanism; the stirrer driving mechanism comprises an operating member, a rack, and a driving shaft; a mounting cavity is formed on an upper surface of the lid body, the rack is arranged inside the mounting cavity, and the operating member is connected to the rack and controls the rack to perform reciprocating movements inside the mounting cavity; the driving shaft comprises an upper gear shaft and a lower connecting shaft; a mounting hole is formed inside the mounting cavity, the driving shaft is arranged inside the mounting hole, the upper gear shaft of the driving shaft meshes with the rack, and the lower connecting shaft of the driving shaft protrudes from a lower surface of the lid body; and the driving shaft drives the stirrer to rotate.

In the present invention, the operating member comprises a handle and a push rod, where the handle comprises a fixed end and a free end, the fixed end of the handle is rotationally connected to one end of the mounting cavity, and the free end of the handle causes the handle to rotate around the fixed end thereof, so as to be rotated out of the mounting cavity or retracted into the mounting cavity; one end of the push rod is connected to the handle, and the other end thereof is connected to the rack; and the handle, the push rod and the rack are connected in a z-shape.

In the present invention, one end of the push rod is connected between the fixed end and the free end of the handle, and the other end of the push rod is connected to one end of the rack far away from the fixed end of the handle.

In the present invention, a return spring is disposed at the fixed end of the handle.

In the present invention, a retention lock for disposing of the handle is arranged towards the free end of the handle in the mounting cavity.

In the present invention, the stirrer driving mechanism further comprises a stirrer connecting component, and the stirrer is detachably connected to the stirrer connecting component.

In the present invention, the stirrer connecting component is a ratchet wheel mechanism, comprising a ratchet wheel, pawls, and a rotating fixed plate; and a central hole is formed on the rotating fixed plate, the rotating fixed plate is sleeved over the lower connecting shaft of the driving shaft via the through hole, the pawls are movably arranged at both ends of the rotating fixed plate, and the ratchet wheel is sleeved over the connecting shaft and located below the rotating fixed plate.

In the present invention, the ratchet wheel is inter-engaged with the pawls.

In the present invention, the stirrer comprises a latching portion, a connecting rod, and a stirring member; an outer wall of the ratchet wheel is provided with a latching interface; and the stirrer is detachably connected to the latching interface of the ratchet wheel via the latching portion.

In the present invention, the stirring member comprises a middle component and at least two blades arranged on the middle component, the blades are symmetrically arranged around the middle component, and the middle component is connected to the connecting rod.

In the present invention, each of the blades has a guiding surface, and the guiding surface forms an angle of less than 90° with a bottom surface of the pot body.

By means of the above technical solution, the present invention has the following advantages:

Firstly, the stirrer is driven to rotate by using the rack and gear shaft, which is simple and direct. Secondly, the ratchet mechanism is adopted to ensure that the stirrer rotates in one direction, such that the processed material in the pot are fully stir-fried and the processed material is heated evenly. Thirdly, an outer wall of the ratchet wheel is provided with a latching interface, making the stirrer easy to be removed and replaced with different types of stirrer. Fourthly, the guiding surface forms an angle of less than 90° with a bottom surface of the pot body, such that the processed material at a bottom of the pot can be stirred up to avoid scorching on the bottom. Fifthly, the cooking utensil can be used not only for making popcorn but also for stir-frying, beating eggs, and other cooking purposes.

Figure 1:
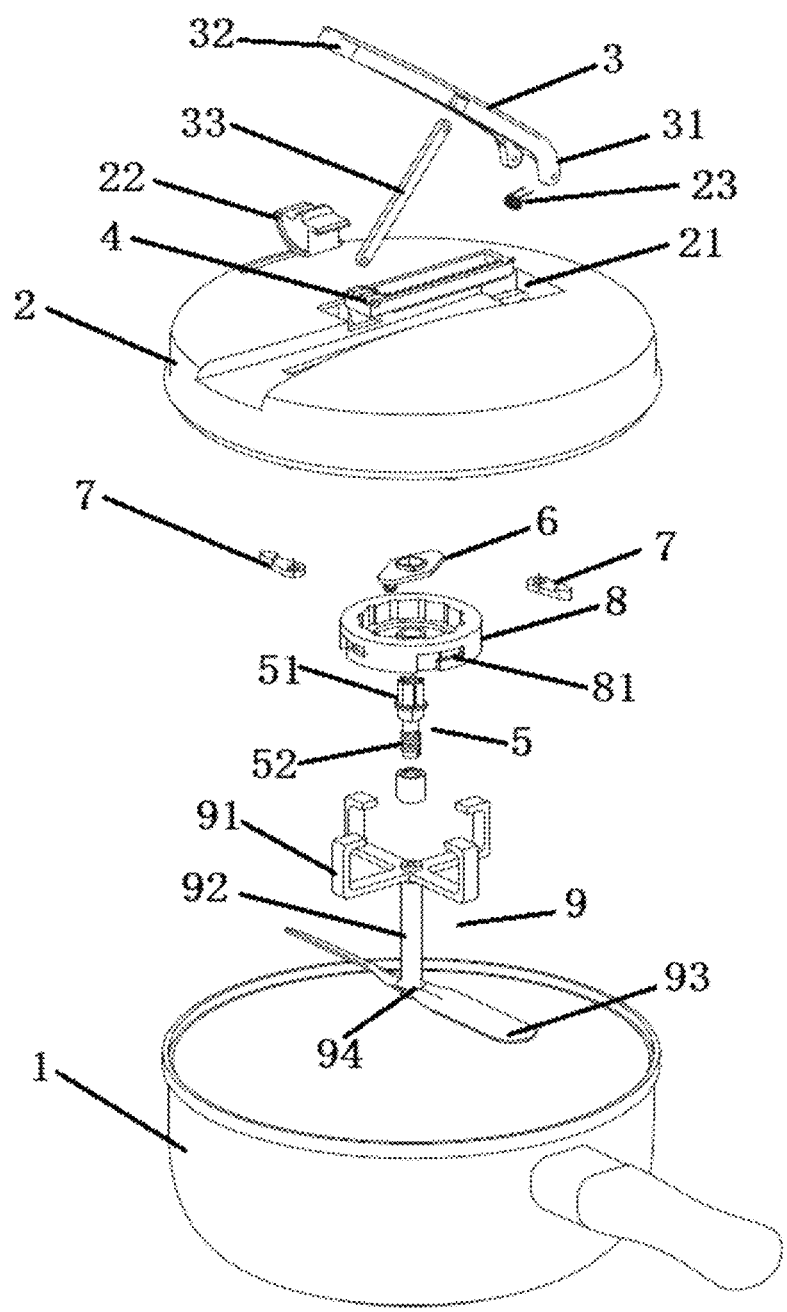
FIG. 1 is an exploded view showing the structure of the cooking utensil of the present invention.

Reference numerals in the drawings refer to the following structures: 1—pot body; 2—lid body; 21—mounting cavity; 22—retention lock; 23—return spring; 3—handle; 31—fixed end; 32—free end; 33—push rod; 4—rack; 5—driving shaft; 51—gear shaft; 52—connecting shaft; 6—rotating fixed plate; 7—pawl; 8—ratchet wheel; 81—latching interface; 9—stirrer; 91—latching portion; 92—connecting rod; 93—blade; and 94—middle component.

DETAILED DESCRIPTION OF THE INVENTION

The present invention will be further described below with reference to the accompanying drawings. The accompanying drawings are for illustrative purposes only and are not to be construed as limiting the present invention.

In order to more concisely describe the present invention, some parts well known to those skilled in the art but unrelated to the main content of the present invention may be omitted in the accompanying drawings or the description. In addition, for the convenience of description, some parts in the accompanying drawings can be omitted, enlarged or reduced, but do not represent a size or an entire structure of an actual product.

The present invention provides a cooking utensil with stirring function, as shown in FIGS. 1-5, which comprises a pot body 1 and a lid body 2, and is further provided with a stirrer 9 and a stirrer driving mechanism.

As shown in FIG. 1, the stirrer driving mechanism comprises an operating member, a rack 4, and a driving shaft 5. A mounting cavity 21 is formed on an upper surface of the lid body 2, the rack 4 is arranged inside the mounting cavity 21, and the operating member is connected to the rack 4 and controls the rack 4 to perform reciprocating movements inside the mounting cavity 21; preferably, the operating member comprises a handle 3 and a push rod 33, where the handle 3 comprises a fixed end 31 and a free end 32, the fixed end 31 of the handle 3 is rotationally connected to one end of the mounting cavity 21, and the free end 32 of the handle 3 causes the handle 3 to rotate around the fixed end 31 thereof, so as to be rotated out of the mounting cavity 21 or retracted into the mounting cavity 21; one end of the push rod 33 is connected to the handle 3, and the other end thereof is connected to the rack 4; and the handle 3, the push rod 33 and the rack 4 are connected in a z-shape.

Figure 5:
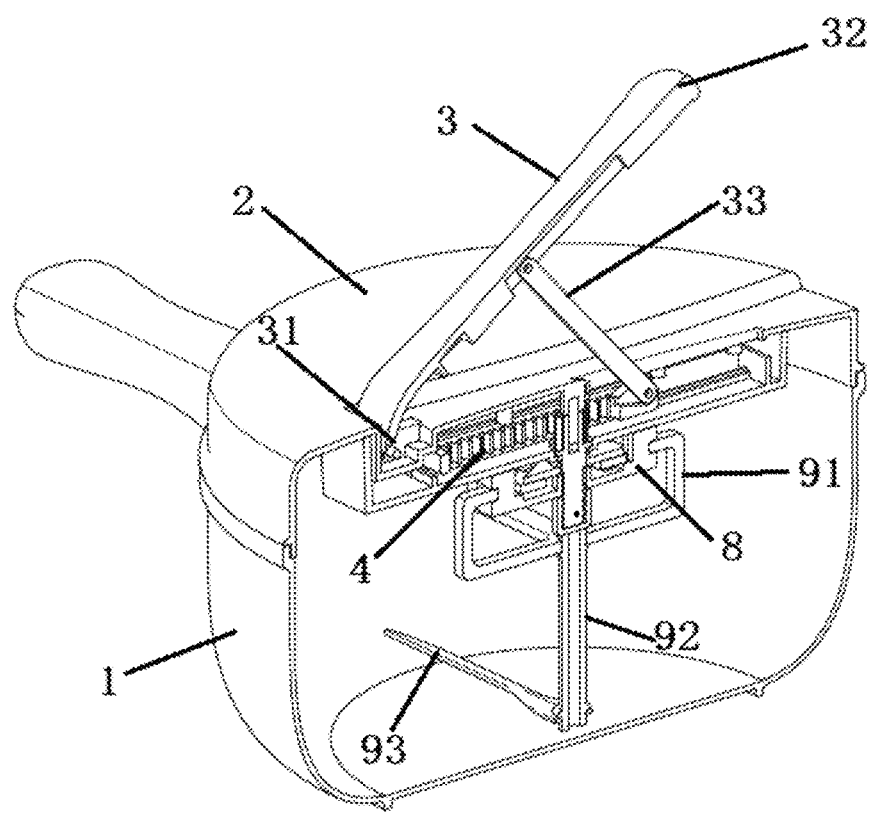
FIG. 5 is a sectional view showing the structure in the cooking utensil of the present invention where the handle is rotated out of the mounting cavity.

As shown in FIG. 5, when the free end 32 of the handle 3 is lifted upwards, the handle 3 drives the push rod 33 to rotate out of the mounting cavity 21, and the push rod 33 pulls the rack 4 to move in a direction of the fixed end 31 of the handle 3 inside the mounting cavity 21.

Figure 4:
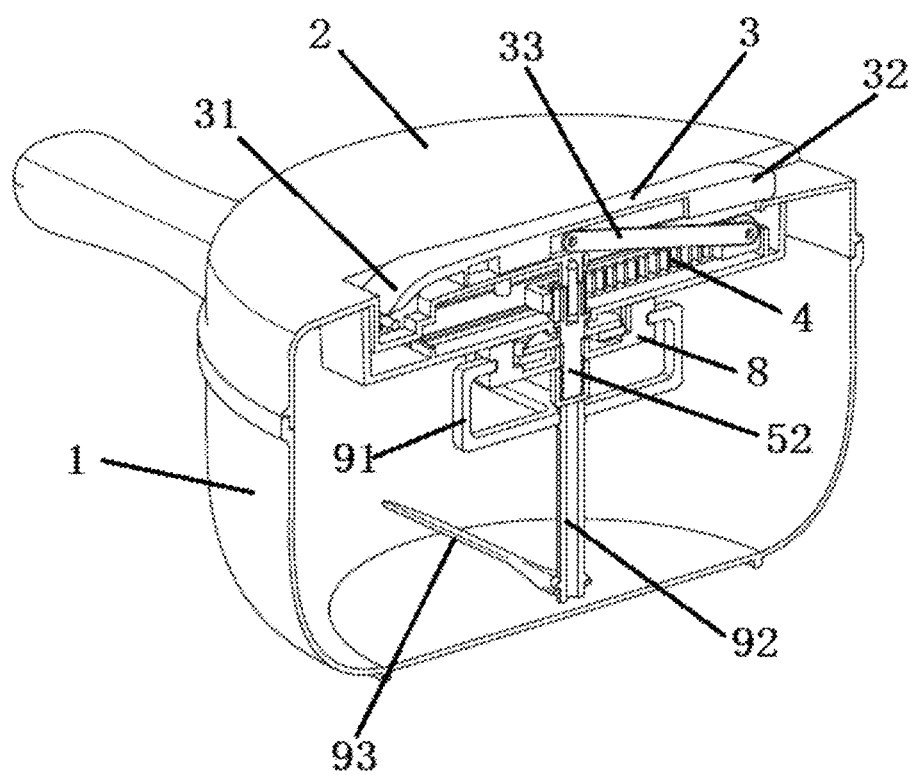
FIG. 4 is a sectional view showing the structure in the cooking utensil of the present invention where the handle is retracted into the mounting cavity.

As shown in FIG. 4, when the free end 32 of the handle 3 is pressed down, the handle 3 is pressed into the mounting cavity 21, and the push rod 33 drives the rack 4 to move in a direction of the free end 32 of the handle 3 inside the mounting cavity 21.

Preferably, in order to make the operation labor-saving, one end of the push rod 33 is connected between the fixed end 31 and the free end 32 of the handle 3, and the other end of the push rod 33 is connected to one end of the rack 4 far away from the fixed end 31 of the handle 3, that is, the end that is close to the free end 32 of the handle 3.

Further, a return spring 23 is disposed at the fixed end 31 of the handle 3; after the handle 3 is pressed into the mounting cavity 21 and released, the handle 3 can rotate out of the mounting cavity 21 under the action of the return spring 23, facilitating manual operation. Correspondingly, when not in use, the handle 3 will be retracted into the mounting cavity 21. In order to prevent the handle 3 from being ejected from the mounting cavity 21 under the action of the return spring 23, a retention lock 22 for disposing the handle 3 is arranged towards the free end 32 of the handle 3 in the mounting cavity 21.

Figure 2:
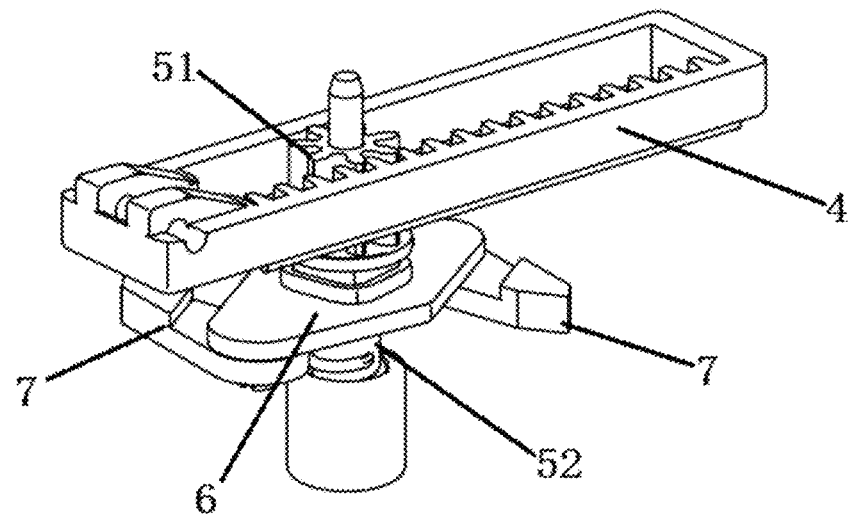
FIG. 2 shows the structure of the connection between the rack and the driving shaft in the cooking utensil of the present invention.
Figure 3:
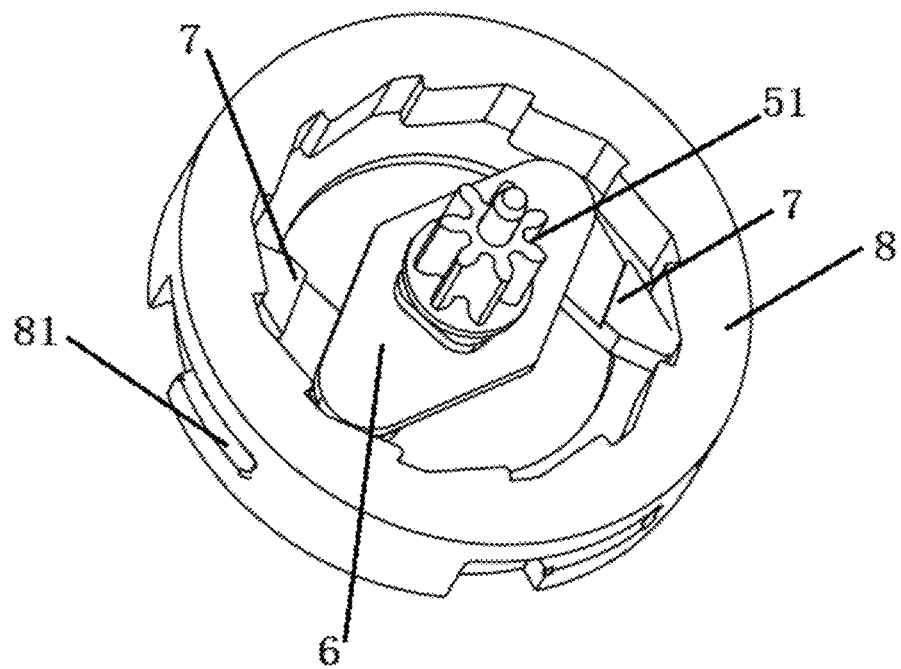
FIG. 3 shows the ratchet wheel mechanism in the cooking utensil of the present invention.

As shown in FIGS. 1-3, the driving shaft 5 comprises an upper gear shaft 51 and a lower connecting shaft 52; a mounting hole is formed inside the mounting cavity 21, the driving shaft 5 is arranged inside the mounting hole, the upper gear shaft 51 of the driving shaft meshes with the rack 4; when the handle 3 drives the rack 4 to move, the rack 4 also drives the driving shaft 5 to rotate via the gear shaft 51; and the lower connecting shaft 52 of the driving shaft 5 protrudes from a lower surface of the lid body 2.

The stirrer driving mechanism further comprises a stirrer connecting component, the stirrer 9 is detachably connected to the stirrer connecting component, and the driving shaft 5 drives the stirrer 9 to rotate through the stirrer connecting component.

As shown in FIGS. 2 and 3, the stirrer connecting component is a ratchet wheel mechanism, comprising a ratchet wheel 8, pawls 7, and a rotating fixed plate 6; and a central hole is formed on the rotating fixed plate 6, the rotating fixed plate 6 is sleeved over the lower connecting shaft 52 of the driving shaft 5 via the through hole, the pawls 7 are movably arranged at both ends of the rotating fixed plate 6, and the ratchet wheel 8 is sleeved over the connecting shaft 52 and located below the rotating fixed plate 6.

As shown in FIG. 3, the ratchet wheel 8 is in a cylinder with an opening at an upper end, and a teeth slot of the ratchet wheel 8 is located on an inner wall of the cylinder, the rotating fixed plate 6 and the pawls 7 are mounted inside the ratchet wheel 8, and the ratchet wheel 8 and pawls 7 form an internal meshing relationship. When the driving shaft 5 rotates in one direction (such as clockwise), the rotating fixed plate 6 is driven to rotate, the pawls 7 open towards an inner wall of the ratchet wheel 8 under the centrifugal force of the rotating fixed plate 6, and insert into the teeth slot of the ratchet wheel 8 to drive the ratchet wheel 8 to rotate; and when the driving shaft 5 rotates in an opposite direction (such as counterclockwise), the pawls 7 slide over the teeth slot of the ratchet wheel 8, and the ratchet wheel 8 does not rotate. Therefore, the ratchet wheel mechanism can ensure that the stirrer 9 rotates in only one direction.

With further reference to FIGS. 4 and 5, the stirrer 9 comprises a latching portion 91, a connecting rod 92, and a stirring member; an outer wall of the ratchet wheel 8 is provided with a latching interface 81; and the stirrer 9 is detachably connected to the latching interface 81 of the ratchet wheel 8 via the latching portion 91.

The stirring member comprises a middle component 94 and at least two blades 93 arranged on the middle component 94, the blades 93 are symmetrically arranged around the middle component 94, and the middle component 94 is connected to the connecting rod 92.

Each of the blades 93 has a guiding surface, and the guiding surface forms an angle of less than 90° with a bottom surface of the pot body 1.

As shown in FIG. 4, when the free end 32 of the handle 3 is pressed down, the handle 3 is pressed into the mounting cavity 21, and the push rod 33 drives the rack 4 to move in a direction of the free end 32 of the handle 3 inside the mounting cavity 21. When the rack 4 drives the gear shaft 51 to rotate clockwise, the rotating fixed plate 6 is driven to rotate clockwise; the pawls 7 are inserted into the teeth slot of the ratchet wheel 8, and the ratchet wheel 8 is driven to rotate clockwise, which in turn drives the stirrer 9 to rotate clockwise; and the blades 93 rotate with the stirrer 9, and the guiding surfaces of the blades 93 stir the processed material inside the pot body 1, such that the processed material inside the pot body 1 receive even heating, and the processed material is prevented from gathering at the bottom of the pot, thus avoiding scorching.

As shown in FIG. 5, when the free end 32 of the handle 3 is lifted upwards, the handle 3 drives the push rod 33 to rotate out of the mounting cavity 21, and the push rod 33 pulls the rack 4 to move in a direction of the fixed end 31 of the handle 3 inside the mounting cavity 21. The rack 4 drives the gear shaft 51 to rotate counterclockwise, the rotating fixed plate 6 is then driven to rotate counterclockwise, the pawls 7 slide over the teeth slot of the ratchet wheel 8, such that the ratchet wheel 8 does not rotate, and the stirrer 9 remains stationary.

When the handle 3 is pressed again, the stirrer 9 will rotate again. By pressing and lifting the handle, the ratchet wheel 8 will rotate in one direction, such that the stirrer 9 can be ensured to rotate in only one direction. When the solution is applied to make popcorn, the stirrer 9 rotates in one direction, which allows for complete popping of the popcorn without scorching at the bottom of the pot.

The stirrer 9 of the present invention is detachable; and an outer wall of the ratchet wheel 8 is provided with a latching interface 81, such that different types of the stirrer 9 can be mounted. The present invention can be used not only for making popcorn but also for stir-frying, beating eggs, and other cooking purposes.

The cooking utensil of the present invention avoids uneven heating, insufficient popping, and easy scorching of processed material at bottoms as those problems in the existing popcorn machines.

The above-mentioned contents are merely preferred examples of the present invention and are not intended to limit the implementation scope of the present invention, that is, all equivalent changes and modifications made according to the contents of the patent scope of the present invention shall fall within the technical scope of the present invention.

We claim:

1. A cooking utensil with stirring function, comprising
a pot body,
a lid body, wherein a mounting cavity is formed on an upper surface of the lid body, and a mounting hole is formed inside the mounting cavity,
a stirrer driving mechanism, wherein the stirrer driving mechanism further comprises a ratchet wheel mechanism, the ratchet wheel mechanism comprises a ratchet wheel, pawls, and a rotating fixed plate, a central hole is formed on the rotating fixed plate, the rotating fixed plate is sleeved over a lower connecting shaft of a driving shaft via the central hole, an outer wall of the ratchet wheel is provided with a latching interface, the pawls are movably arranged at both ends of the rotating fixed plate, the ratchet wheel is sleeved over the lower connecting shaft and located below the rotating fixed plate, and teeth slots on an inner wall of the ratchet wheel are inter-engaged with the pawls,
an operating member, wherein the operating member comprises a handle and a push rod, the handle comprises a fixed end and a free end, the fixed end of the handle is rotationally connected to one end of the mounting cavity, the free end of the handle causes the handle to rotate around the fixed end to be rotated out of the mounting cavity or retracted into the mounting cavity, one end of the push rod is connected to the handle, and the other end of the push rod is connected to a rack at an end of the rack far away from the fixed end of the handle, and the handle, the push rod, and the rack are connected in a Z-shape,
the rack, wherein the rack is arranged inside the mounting cavity and connected to the operating member, and the operating member controls the rack to perform reciprocating movements inside the mounting cavity,
the driving shaft, wherein the driving shaft comprises an upper gear shaft and the lower connecting shaft, the driving shaft is arranged inside the mounting hole, the upper gear shaft meshes with the rack, and the lower connecting shaft protrudes from a lower surface of the lid body towards a bottom surface of the pot body, and the driving shaft drives a stirrer to rotate through the stirrer driving mechanism, and
the stirrer, wherein the stirrer comprises a latching portion, a connecting rod, and a stirring member, the stirrer is detachably connected to the latching interface of the ratchet wheel through the latching portion to form a latched connection, the stirring member comprises a middle component and at least two blades arranged on the middle component, the blades are symmetrically arranged around the middle component, the middle component is connected to the connecting rod, and each of the blades has a guiding surface that forms an angle of less than 90° with the bottom surface of the pot body, wherein the rack is driven by the handle through the push rod to move inside the mounting cavity in one direction, the driving shaft is driven by the movement of the rack through the upper gear shaft to rotate in one direction, the rotating fixed plate is in turn driven to rotate and cause the pawls to open towards the inner wall of the ratchet wheel and insert into the teeth slots on the inner wall of the ratchet wheel to drive the ratchet wheel to rotate, and the stirrer is driven to rotate by the ratchet wheel through the latched connection, and the rack is driven by the handle through the push rod to move inside the mounting cavity in a reverse direction, the driving shaft is driven by the reverse movement of the rack through the upper gear shaft to rotate in an opposite direction and cause the pawls to slide over the teeth slots on the inner wall of the ratchet wheel and stop rotating the ratchet wheel, and the stirrer stops rotating.

2. The cooking utensil with stirring function according to claim 1, wherein a return spring is disposed at the fixed end of the handle.

3. The cooking utensil with stirring function according to claim 1, wherein a retention lock for disposing the handle is arranged in the mounting cavity towards the free end of the handle.

* * * * *